April 13, 1926.
T. F. BARTON
1,580,802
ELECTRIC REGULATING SYSTEM
Filed June 13, 1924
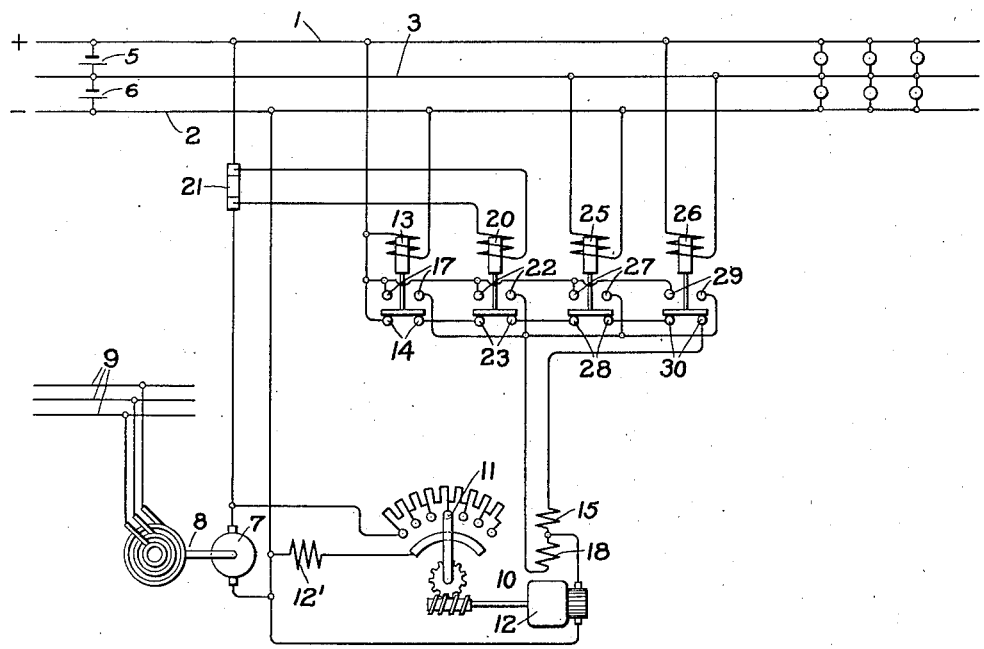
Inventor:
Theophilus F. Barton,
by *Alexander S. ____*
His Attorney.

Patented Apr. 13, 1926.

1,580,802

UNITED STATES PATENT OFFICE.

THEOPHILUS F. BARTON, OF SCHENECTADY, NEW YORK, ASSIGNOR TO GENERAL ELECTRIC COMPANY, A CORPORATION OF NEW YORK.

ELECTRIC REGULATING SYSTEM.

Application filed June 13, 1924. Serial No. 719,778.

*To all whom it may concern:*

Be it known that I, THEOPHILUS F. BARTON, a citizen of the United States, residing at Schenectady, in the county of Schenectady, State of New York, have invented certain new and useful Improvements in Electric Regulating Systems, of which the following is a specification.

My invention relates to electric regulating systems and particularly to a voltage regulating system for three-wire direct current systems.

It is becoming the general practice to use a number of two-wire machines, such as ordinary direct current generators, for supplying power to a three-wire system. In order to maintain a definite voltage between the neutral conductor and the two outside conductors of the system, storage batteries are usually connected between the neutral and the two outside conductors. This result is also obtained when any three wire machines, such as synchronous converters with the neutral conductor of the system connected to the middle points of the secondary windings supplying the converter, are also used to supply power to the three-wire system. In case, however, no storage battery capacity or an inadequate battery capacity or no three-wire machines or an inadequate capacity of three-wire machines is connected to the system, some means must be provided to protect against overvoltage on either side of the three-wire system, as otherwise the voltage of the neutral will depend upon the division of load between the neutral and the outside conductors of the system. For example, with a short circuit between the neutral and either outside conductor there is a tendency to impress double normal voltage between the neutral and the other outside conductor.

One object of my invention is to provide an improved regulating system for preventing overvoltage between the neutral and either outside conductor of a three-wire direct current system.

My invention will be better understood from the following description when taken in connection with the accompanying drawing, which shows one embodiment of my invention, and its scope will be pointed out in the appended claims.

Referring to the accompanying drawing, 1, 2 and 3 represent respectively the positive, negative and neutral conductors of a three-wire direct current distribution circuit which may be supplied by a number of three-wire machines (not shown) and which may have a number of storage batteries 5 and 6 connected respectively between the neutral conductor 3 and the positive and negative conductors 1 and 2 to help maintain the voltage of the neutral fixed with respect to the voltage across the outside conductors.

7 represents a direct current generator of a motor generator set 8 which is arranged to transfer power from an alternating current supply circuit 9 to the three-wire circuit 1, 2, 3. It will be apparent, however, that so far as my invention is concerned it is immaterial whether the generator is driven by a dynamo electric machine or some other prime mover. The generator 7 is connected between the positive and negative conductors 1 and 2 of the distribution circuit.

In order to maintain the voltage constant across the main circuit of the distribution circuit, the generator is provided with an automatic voltage regulator 10 which may be of any suitable type. As shown, the regulator comprises a rheostat 11 in the circuit of the shunt field winding 12' of the generator 7, the rheostat being arranged to be operated by a reversible motor 12 which is controlled by a voltage relay 13 connected between the positive and negative conductors 1 and 2 of the three-wire distribution circuit. When the voltage between the outside conductors is below a predetermined value the relay 13 closes its contacts 14 and completes a circuit through the field winding 15 and the armature winding of the motor 12 to cause the motor 12 to rotate in a direction to decrease the amount of resistance in the circuit of the field winding 12. When the voltage is above a predetermined value the relay 13 closes its contacts 17 and completes a circuit through the field winding 18 and the armature winding of the motor 12 to cause the motor 12 to rotate in a direction to increase the amount of resistance in the circuit of the field winding 12. It will be evident that so long as the excitation of the generator 7 is under the control of the voltage relay 13, the excitation is automatically varied to maintain constant voltage across the outside conductors of the three wire distribution circuit.

In order to limit the output of the generator under abnormal load conditions, such as an overload or short circuit, I provide a current relay 20 which is so connected as to be responsive to the current output of the generator and which is arranged to remove the control of the excitation of the generator 7 from the voltage relay 13 when the current output exceeds a predetermined value and to control the excitation to maintain the current output of the generator below said predetermined value. As shown, the relay 20 is connected across a resistance shunt 21 in series with the generator 7 and is provided with the contacts 22 which are closed when the current through the coil of the relay 20 exceeds a predetermined value and with the contacts 23 which are closed when the current is below a predetermined value. The contacts 22 are connected in parallel with the contacts 17 and the contacts 23 are connected in series with the contacts 14 of the relay 13. Therefore, whenever the current output of the generator 7 causes the relay 20 to open its contacts 23 and close its contacts 22, the motor 12 is operated independently of the position of the voltage relay 13 to reduce the excitation of the generator 7 so as to maintain the current output of the generator below a predetermined value.

In order to maintain the voltages between the neutral and the two outside conductors below predetermined values when, for any reason, the voltages tend to become excessive, I provide the two voltage relays 25 and 26, which are respectively connected between the neutral conductor 2 and the positive conductor 1 and between the neutral conductor 2 and the negative conductor 3. Each of these relays is arranged, whenever the voltage impressed thereon tends to increase above a predetermined value, to remove the control of the excitation of the generator from the voltage relay 13 and the current relay 20 and to control the excitation so as to maintain the voltage across the respective circuit below the predetermined value. As shown the voltage relay 25 is provided with the contacts 27 which are connected in parallel with the contacts 17 and 22 of the relays 13 and 20 and which are closed when the voltage across the conductors 2 and 3 is above a predetermined value and with the contacts 28 which are connected in series with the contacts 14 and 23 of the relays 13 and 20 and which are closed when the voltage across the conductors 2 and 3 is below a predetermined value. The voltage relay 26 is similarly provided with the contacts 29 which are connected in parallel with the contacts 17 and 22 of the relays 13 and 20 and which are closed when the voltage across the conductors 1 and 3 is above a predetermined value and with the contacts 30 which are connected in series with the contacts 14 and 23 of the relays 13 and 20 and which are closed when the voltage across the conductors 1 and 3 is below a predetermined value. Therefore, it is evident that whenever either one of the relays 25 and 26 is operated in response to an over-voltage across its respective side of the three-wire circuit, the motor 12 is operated to reduce the excitation of the generator 7 independently of the positions of the other control relays to maintain the voltage across the respective sides of the three-wire circuit below a predetermined value.

The operation of the system shown is as follows: Under normal conditions the voltage relay 13 controls the operation of the motor 12 to maintain constant voltage across the outside conductors 1 and 2. So long as the current output of the generator is below a predetermined value, the contacts 23 of the current control relay 20 remain closed so that when the relay 13 closes its contacts 14 the circuit of field winding 15 is completed to cause the motor 12 to rotate in a direction to reduce the amount of the resistance in the circuit of the field winding 12. The relays 25 and 26 are also preferably arranged so that they do not operate to open their respective contacts 28 and 30 in the circuit of the field winding 15 until the voltages across the conductors 2 and 3 and conductors 1 and 2 respectively exceed their normal values by a predetermined amount. Therefore, so long as the load on the generator is below a predetermined value and the voltage between the neutral conductor and each outside conductor is less than a predetermined value, constant voltage is maintained between conductors 1 and 2.

In case the output current of the generator exceeds a predetermined value, the relay 20 opens its contacts 23 and closes its contacts 22. The closing of the contacts 22 completes the circuit of the motor 12 through its field winding 18 so that the motor operates the rheostat 11 to increase the amount of resistance in the circuit of the field winding 12 to reduce the voltage and thereby the current output of the generator. Although the voltage of the generator is reduced sufficiently to cause the voltage relay 13 to close its contacts 14, the closing of these contacts does not cause the motor 12 to be operated to increase the excitation of the generator because the circuit of the motor 12 through the contacts 14 is open at the contacts 23 of the relay 20. Therefore, it will be evident that when the current output of the generator tends to exceed a predetermined value the current relay 20 assumes control of the excitation of the generator 7 and prevents the current exceeding a predetermined value.

In case the voltage between the neutral conductor 3 and either one of the outside conductors 1 and 2 tends for any reason to exceed a predetermined value, the voltage relay connected across the particular conductors in question completes the circuit for the motor 12 and its field winding 18 to decrease the voltage of the generator independently of the positions of the relays 17 and 20. For example, let it be assumed that the voltage between the conductors 1 and 3 increases so that the relay 26 opens its contacts 30 and closes its contacts 29. The closing of the contacts 29 completes the circuit of the motor 12 and its field winding 18 to decrease the excitation of the generator 7 so as to maintain the voltage between the conductors 1 and 3 below a predetermined value. The opening of the contacts 30 when the relay 26 is energized sufficiently to close its contacts 29 prevents any of the other relays from completing the circuit of the motor 12 and its field winding 15, although these other relays may be in a position to cause the motor to increase the excitation of the generator 7.

It will be evident from the above description that I have provided a regulating system for maintaining constant voltage across the outside conductors of the three-wire system provided the voltage between the neutral conductor and each outside conductor does not exceed a predetermined value. If the voltage between the neutral and one of the outside conductors does exceed a predetermined value, the voltage relay, which is connected between these two conductors operates independently of the voltage relay connected across the two outside conductors to lower the voltage of the generator to limit the excessive voltage.

While I have in accordance with the patent statutes shown and described my invention as applied to a particular system and as embodying various devices diagrammatically indicated, changes and modifications will be obvious to those skilled in the art, and I, therefore, aim in the appended claims to cover all such variations and modifications as fall within the true spirit and scope of my invention.

What I claim as new and desire to secure by Letters Patent of the United States is:—

1. In combination, a three-wire direct current circuit, a generator connected to the two outside conductors of said circuit, and means for regulating the excitation of said generator in response to the voltage between the neutral conductor of said circuit and one of the outside conductors thereof.

2. In combination, a three-wire direct current circuit, a generator connected to the two outside conductors of said circuit, and means operative to regulate the excitation of said generator to maintain constant voltage between the outside conductors of said circuit when the voltages between the neutral conductor and the outside conductors do not exceed predetermined values and to lower the voltage between the outside conductors to maintain the voltage between the neutral conductor and either outside conductors at said predetermined value if the said last mentioned voltage tends to exceed said predetermined value.

3. In combination, a three-wire direct current circuit, a generator connected to the two outside conductors of said circuit, means responsive to the voltage between the two outside conductors of said circuit for automatically controlling the excitation of said generator to maintain constant voltage between the outside conductors of said circuit, and means responsive to the voltage between the neutral conductor and one of the outside conductors of said circuit for controlling the excitation of said generator.

4. In combination, a three-wire direct current circuit, a generator connected to the two outside conductors of said circuit, means responsive to the voltage between the two outside conductors of said circuit for automatically controlling the excitation of said generator to maintain constant voltage between the two outside conductors, and means responsive to the voltages between the neutral conductor and the outside conductors of said circuit for preventing said first mentioned means from controlling the excitation of said generator to maintain constant voltage and for controlling the excitation of said generator to maintain the voltages between the neutral conductor and said outside conductors below predetermined values.

5. In combination, a three-wire direct current circuit, a generator connected between the two outside conductors of said circuit, a voltage relay responsive to the voltage between the outside conductor of said circuit for controlling the excitation of said generator, and a voltage relay responsive to the voltage between the neutral and one of the outside conductors of said circuit arranged to effect a decrease in the excitation of said generator independently of the position of said first mentioned voltage relay when the voltage across said second mentioned voltage relay exceeds a predetermined value.

6. In combination, a three-wire direct current circuit, a generator connected between the two outside conductors of said circuit, a motor operated rheostat for controlling the excitation of said generator, a circuit for causing the motor of said motor operated rheostat to operate in a direction to decrease the amount of resistance in the field circuit of said generator, a plurality of sets of contacts connected in series in said motor circuit, a voltage relay connected between the outside conductors of said three-wire circuit for controlling one of said sets of contacts, and a voltage relay connected between the neutral and one of the outside conductors of said three-wire circuit for controlling another set of contacts.

7. In combination, a three-wire direct current circuit, a generator connected between the two outside conductors of said circuit, a rheostat connected so that adjustment thereof varies the excitation of said generator, a motor for operating said rheostat, a circuit for causing said motor to rotate in a direction to operate said rheostat to decrease the excitation of said generator, a plurality of sets of contacts connected in series in said motor circuit, means responsive to the current output of said generator for controlling one of said sets of contacts, and means responsive to the voltage between the neutral and one of the outside conductors of said three-wire circuit for controlling another set of said contacts.

8. In combination, a three-wire direct current circuit, a generator connected between the two outside conductors of said circuit, a rheostat connected so that adjustment thereof varies the excitation of said generator, a motor for operating said rheostat, a circuit for said motor for causing said motor to rotate in a direction to operate said rheostat to decrease the excitation of said generator, another circuit for said motor for causing said motor to rotate in a direction to operate said rheostat to increase the excitation of said generator, a plurality of sets of contacts connected in series in said first mentioned motor circuit, a plurality of sets of contacts connected in parallel in said second mentioned motor circuit, means responsive to the voltage between the outside conductors of said three-wire circuit for controlling one set of contacts in each of said plurality of sets of contacts, and means responsive to the voltage between a neutral and one of the outside conductors of said three-wire circuit for controlling another set of contacts in each of said plurality of sets of contacts.

9. In combination, a three-wire direct current circuit, a generator connected between the two outside conductors of said circuit, a rheostat connected so that adjustment thereof varies the excitation of said generator, a motor for operating said rheostat, a circuit for said motor for causing said motor to rotate in a direction to operate said rheostat to decrease the excitation of said generator, another circuit for said motor for causing said motor to rotate in a direction to operate said rheostat to increase the excitation of said generator, a plurality of sets of contacts connected in series in said first mentioned motor circuit, a plurality of sets of contacts connected in parallel in said second mentioned motor circuit, means responsive to the current output of said generator for controlling one set of contacts in each of said plurality of sets of contacts, and means responsive to the voltage between the neutral and one of the outside conductors of said three-wire circuit for controlling another set of contacts in each of said plurality of sets of contacts.

In witness whereof, I have hereunto set my hand this 12th day of June, 1924.

THEOPHILUS F. BARTON.